(12) United States Patent
Nashner et al.

(10) Patent No.: US 10,434,603 B2
(45) Date of Patent: Oct. 8, 2019

(54) FORMING A TEXTURED PATTERN USING A LASER

(71) Applicant: Apple Inc., Cupertino, CA (US)

(72) Inventors: Michael S. Nashner, Cupertino, CA (US); Peter N. Russell-Clarke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 856 days.

(21) Appl. No.: 14/311,271

(22) Filed: Jun. 21, 2014

(65) Prior Publication Data

US 2015/0367443 A1    Dec. 24, 2015

(51) Int. Cl.
*B23K 26/352*    (2014.01)
*B23K 26/00*    (2014.01)
(Continued)

(52) U.S. Cl.
CPC ........ *B23K 26/355* (2018.08); *B23K 26/0006* (2013.01); *B23K 26/0624* (2015.10); *B23K 26/082* (2015.10); *B23K 26/0823* (2013.01); *B23K 26/0869* (2013.01); *B23K 26/103* (2013.01); *B23K 26/361* (2015.10); *B44C 1/228* (2013.01); *B23K 2101/35* (2018.08); *B23K 2103/08* (2018.08); *B23K 2103/10* (2018.08);
(Continued)

(58) Field of Classification Search
CPC .................. B23K 26/0084; B23K 26/0624
See application file for complete search history.

(56) References Cited

U.S. PATENT DOCUMENTS 5,235,169 A    8/1993    Wakaumi et al.
5,635,269 A    6/1997    Weir et al.
(Continued)

FOREIGN PATENT DOCUMENTS

DE    4106151    11/1991
FR    2975617    11/2012
(Continued)

OTHER PUBLICATIONS

Research on Structure and Control System of Laser Surface Texturing Machine Zhang et al. ISSN: 1662-7482, vol. 43, pp. 610-613 doi:I 0.4028/www.scientific.net/AMM.43. 610 © 2011 Trans Tech Publications, Switzerland.*
(Continued)

*Primary Examiner* — Robert C Dye
*Assistant Examiner* — Nicholas R Krasnow
(74) *Attorney, Agent, or Firm* — Dickinson Wright RLLP

(57) ABSTRACT

Systems and methods for producing a textured pattern on a surface of a part using a laser. The part or laser may be rotated while forming the textured pattern to create a continuous textured pattern on a surface of a part. The continuous textured pattern may be substantially uniform over the entire pattern. A laser texturing system may also include an optical scanner. A first region of the surface of the part may be scanned using a first laser beam. One or more laser texturing parameters or a simulated geometric model may be created based on the scan of the first region. The textured pattern may be formed on the first region using a second laser beam. The textured pattern may be formed in accordance with the one or more laser texturing parameters or simulated geometric model.

17 Claims, 14 Drawing Sheets

(51) Int. Cl.
  *B23K 26/08* (2014.01)
  *B23K 26/10* (2006.01)
  *B44C 1/22* (2006.01)
  *B23K 26/082* (2014.01)
  *B23K 26/0622* (2014.01)
  *B23K 26/361* (2014.01)
  *B23K 101/34* (2006.01)
  *B23K 103/08* (2006.01)
  *B23K 103/10* (2006.01)
  *B23K 103/14* (2006.01)

(52) U.S. Cl.
  CPC ...... *B23K 2103/14* (2018.08); *B23K 2103/15* (2018.08)

(56) References Cited

U.S. PATENT DOCUMENTS

| | | | |
|---|---|---|---|
| 5,880,430 A | 3/1999 | Wein | |
| 6,479,790 B1* | 11/2002 | Graham | C21D 10/005 219/121.79 |
| 6,518,544 B2 | 2/2003 | Aberle et al. | |
| 7,272,483 B2 | 9/2007 | Tuschel et al. | |
| 7,875,414 B2 | 1/2011 | Sawada et al. | |
| 7,975,913 B2 | 7/2011 | Kubota et al. | |
| 8,330,122 B2 | 12/2012 | Smith et al. | |
| 8,424,751 B2 | 4/2013 | Liu et al. | |
| 8,534,540 B2 | 9/2013 | Gratton et al. | |
| 8,715,725 B2 | 5/2014 | Stuck et al. | |
| 2002/0021831 A1* | 2/2002 | Dulaney | B23K 26/032 382/152 |
| 2009/0171654 A1 | 7/2009 | Spain | |
| 2010/0054287 A1 | 3/2010 | Ghauri | |
| 2013/0081951 A1* | 4/2013 | Hankey | C25D 11/16 205/50 |
| 2013/0118048 A1 | 5/2013 | Kawanami | |
| 2013/0341400 A1 | 12/2013 | Lancaster-Larocque | |
| 2014/0061172 A1 | 3/2014 | Kuo | |

FOREIGN PATENT DOCUMENTS

| | | | |
|---|---|---|---|
| FR | 2975617 A1 * | 11/2012 | ......... B23K 26/0084 |
| JP | H09296589 | 11/1997 | |
| JP | 2001270300 | 10/2001 | |

OTHER PUBLICATIONS

Hubert, David. Advanced Laser Patterning of a Cylindrical Sample. Diss. State University of New York at Stony Brook, 2012. <https://dspace.sunyconnect.suny.edu/handle/1951/59697>.*

Pantsar—https://www.industrial-lasers.com/articles/print/volume-23/issue-6/features/cover-story/using-lasers-for-decorative-3d-texturing.html (Year: 2008).*

Zhou, Y., Zhang, S., Zhao, S. and Chen, H., 2014. Computer texture mapping for laser texturing of injection mold. Advances in Mechanical Engineering, 6, p. 681563. (Year: 2014).*

Norblast—https://www.youtube.com/watch?v=GkbY1YVgqoM (Year: 2011).*

Invitation to Pay Additional Fees, PCT/US2015/032341, 6 pages, dated Oct. 22, 2015.

* cited by examiner

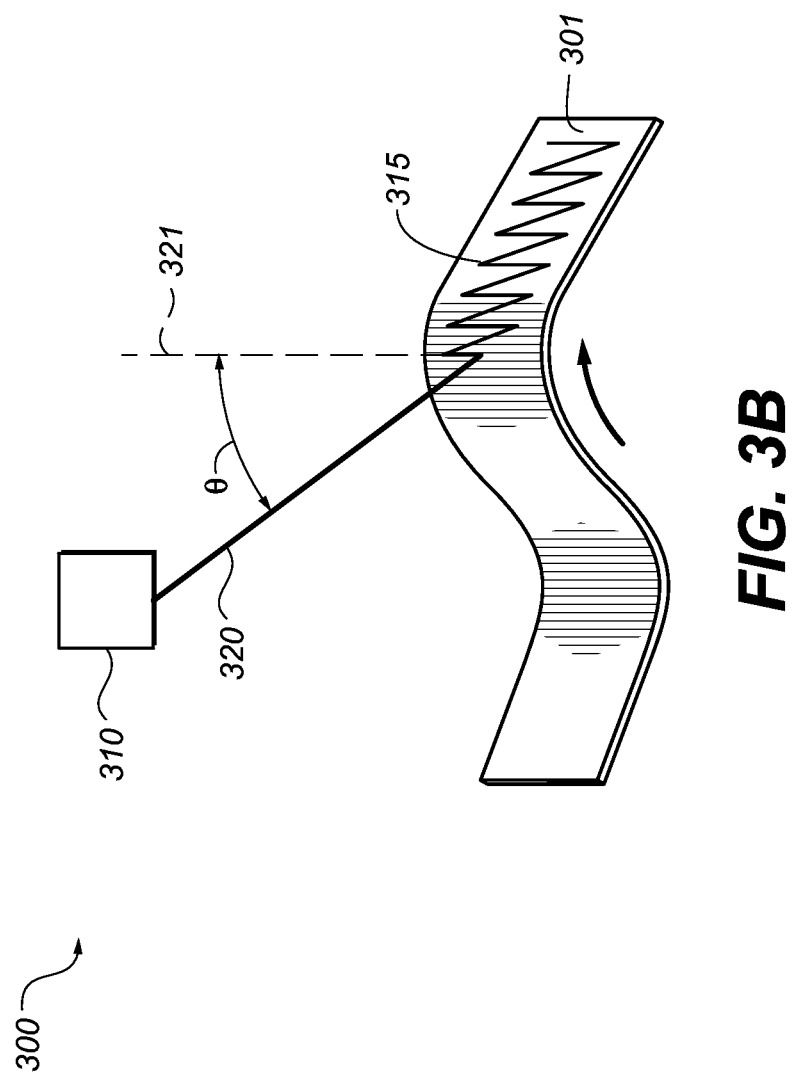

FORMING A TEXTURED PATTERN USING A LASER

TECHNICAL FIELD

This disclosure relates generally to producing a part having a textured surface, and more specifically to using a laser to produce a textured surface having extended or contoured surface geometry.

BACKGROUND

In the field of electronics and portable devices, an enclosure or housing may be used to protect internal components from environmental conditions. The enclosure or housing may also be used to improve the aesthetics of the device. For example, external decorations, such as textured patterns and artwork may be incorporated into the surface enclosure to improve the aesthetic look and feel of the device. In some cases, a pattern on the surface may also serve functional purposes, including providing a tactile surface or providing a marking that identifies the product or manufacturer.

In some cases, a texture or pattern is formed into the part using an injection molding process or similar forming technique. In other cases, a pattern may be applied using an etching or cutting operation the surface of the device. One drawback to some traditional processes is that a pattern can only be applied over a limited area of the surface of the device. To form a larger pattern, the device must be moved and another texture applied. In many cases, the alignment or registration of the two patterns is difficult to perform and the creation of a second patterned region may result in a seam or small gap between the patterns. If a continuous pattern is formed across a large surface using this technique, an undesirable seam or transition may be visible where one or more patterns are joined. In some cases, the pattern in the transition region may be distorted or visually distinguishable from the other portions of the continuous pattern, which may be undesirable in many applications.

Additionally, using some traditional techniques, a contoured or curved surface may also be difficult to pattern without creating distortions or visible variation within a pattern along the curvature. Also, using some traditional techniques, a patterning operation may not be able to account for irregularities or variations in the surface of the device, resulting in a pattern that may be inconsistent and potentially visually undesirable.

What is needed is a system and method of applying a pattern or texture to a surface of a device that reduces or eliminates drawbacks associated with some traditional techniques, as discussed above.

SUMMARY

Some example embodiments are directed to a method of producing a continuous textured pattern on a surface of a part. A first textured pattern may be formed on a first region of the surface of the part using a laser beam, and a second textured pattern may be formed on a second region of the surface of the part. The first and second textured patterns are adjacent to each other and form at least part of the continuous textured pattern. The part may be rotated while forming part of either the first or second textured patterns to create a seamless transition between the first and second textured patterns. The continuous textured pattern may be formed without using a step-and-pattern technique. Another exemplary embodiment is directed to a method of producing a continuous textured pattern on a surface of a part by rotating the laser mechanism while forming part of either the first or second textured patterns to create a seamless transition between the first and second textured patterns.

In some embodiments, the continuous textured pattern is substantially uniform over the first textured pattern, the second textured pattern, and the transition textured pattern. In some cases, the transition textured pattern is visually indistinguishable from the first and second textured patterns. The continuous textured pattern may extend over a contoured region of the surface of the part which may include a concave contour shape and/or a convex contour shape.

Another exemplary embodiment is directed to a method of producing a continuous textured pattern on a surface of a part by forming a first, second, and transition textured pattern. In particular a first textured pattern may be formed on a first region of the surface of the part using a laser beam. A second textured pattern may be formed on a second region of the surface of the part using the laser beam. The first and second textured patterns form at least part of the continuous textured pattern. A transition textured pattern may be formed between the first and second textured patterns using the laser beam. The transition textured pattern is formed by rotating the part while passing the laser beam across the surface of the part.

In some cases, the first textured pattern is formed by passing the laser beam across the surface of the part while the part is stationary. In some cases, the first textured pattern and the second textured pattern are formed passing the laser beam across the surface of the part while the part is stationary. Alternatively, the first textured pattern may be formed by rotating the part while passing the laser beam across the surface of the part. In some cases, the first textured pattern and the second textured pattern are formed by rotating the part while passing the laser beam across the surface of the part.

Another example embodiment is directed to a method of producing a textured pattern on a surface of a part using a laser and a scanner. A first region of the surface of the part may be scanned using a first laser beam. One or more laser texturing parameters or a simulated geometric model may be created based on the scan of the first region. The textured pattern may be formed on the first region using a second laser beam. The textured pattern may be formed in accordance with the one or more laser texturing parameters or simulated geometric model. In some cases, the first laser beam is produced using an optical scanner mechanism and the second laser beam is produced using an ablation laser mechanism.

In one example, the one or more laser texturing parameters includes instructions for controlling the position of the second laser beam with respect to the surface of the part. The scan of the first region may be performed by sweeping the first laser beam across the first region in a raster scan and detecting laser light reflected off the surface of the part. The scan of the first region may be used to determine a surface geometry approximation of the first region. In some cases, the one or more laser texturing parameters are based, at least in part, on the surface geometry approximation.

In one example, the scan of the first region is used to identify a reference point within the first region. The one or more laser texturing parameters may use the reference point to register the textured pattern within the first region.

In another example, the scan of the first region is used to identify a variation in the height of the surface. A laser texturing parameter associated with an ablation depth may be determined based on the variation in height, and at least a portion of the textured pattern is formed at the ablation depth.

In another example, the scan of the first region is used to identify a variation in the contour of the surface. A laser texturing parameter associated with a texturing profile may be determined based on the variation and at least a portion of the textured pattern is formed in accordance with the texturing profile.

BRIEF DESCRIPTION OF THE DRAWINGS

FIGS. 3A-C depict an example system for forming a laser pattern on a part at a uniform angle of incidence.

DETAILED DESCRIPTION

Figure 1A:
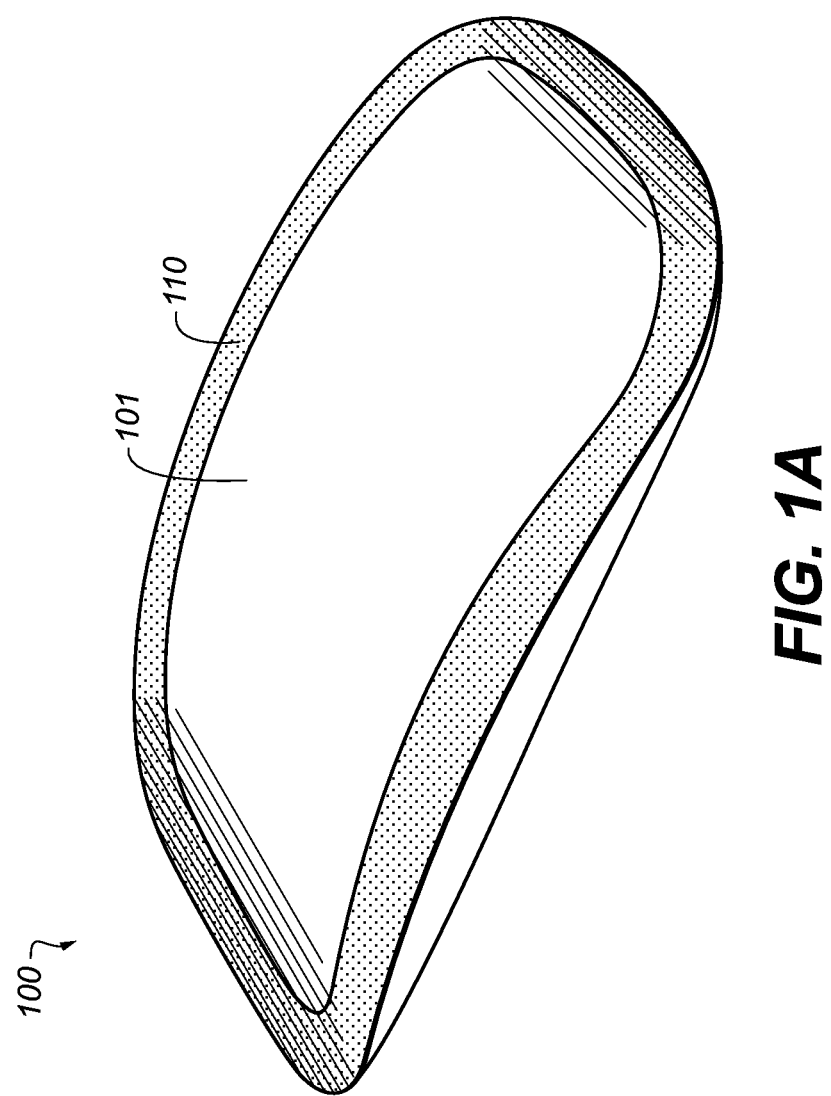
FIG. 1A depicts an example part having a textured surface.

The description that follows includes example systems and processes that embody various elements of the present disclosure. However, it should be understood that the described disclosure may be practiced in a variety of forms in addition to those described herein.

The following embodiments relate to systems, apparatuses, and processes directed to forming a feature on a surface of a device using a laser. In accordance with some of the embodiments, a laser beam is used to ablate, etch, or otherwise alter portions of a surface of a device to create a textured pattern. Examples of laser-formed features are described in U.S. patent application Ser. No. 14/298,499, filed Jun. 6, 2014, which is incorporated by reference herein in its entirety.

In some example embodiments, a laser is used to form a textured pattern on the surface of a part over an extended area to create an extended textured pattern. In general, the extended area may exceed, at least in one direction, the operating scan area of a laser mechanism. As explained in more detail below, an extended textured pattern may be formed as one continuous pattern by rotating either the part, the laser, or both while the laser is forming the textured pattern. In one example, the laser is performing a laser ablation or other texture forming operation simultaneous with the rotation of the part or laser to form at least a portion of the textured pattern.

In contrast to some traditional techniques, the textured pattern is formed without a step-and-pattern operation. That is, with respect to one example, the textured pattern is formed without stopping the laser, rotating or re-positioning the part, and then starting the laser again to form another portion of the textured pattern. In some examples, substantially all of the textured pattern is formed without stopping or pausing a laser scanning or laser-feature forming operation. In some cases, substantially all of the textured pattern is formed while continuously operating the laser to form the texture. Although the textured pattern may be formed as a continuous pattern, the pattern may vary in shape, texture, or otherwise throughout the pattern. While some specific examples provided below are provided with respect to a laser-formed textured pattern, similar techniques can also be applied to other types of laser-formed features including, laser coloring, laser machining, and other laser-based operations.

In one example, a laser is used to form a continuous textured pattern by forming a first textured pattern on a first portion and a second textured pattern on a second portion. In some cases, a transition textured pattern (or transition pattern) is also formed in the transition between the first and second textured patterns. In one example, the transition pattern is formed by rotating the part while passing the laser beam across the surface of the part. In another example, the transition pattern is formed by rotating the laser around the part while the laser beam is passed across the surface of the part. Whether the part or the laser is rotated, the transition pattern may be formed by coordinating the movement of the laser with the rotation of the part or laser. Additionally, the laser is continuously operated when moving from the first pattern to the transition pattern and from the transition pattern to the second pattern. In some cases, the transition pattern is used to create a uniform, continuous pattern that is free of seams or discontinuities between the first and second textured patterns. In some cases, a transition is formed between adjacent patterns by rotating the part or laser while either one or both of the adjacent patterns is being formed. Thus, in accordance with the systems and techniques described herein, a laser can be used to produce an extended, seamless textured pattern over the surface of a part.

In accordance with some embodiments, the rotation of the part (or the rotation of the laser) is used to maintain a substantially constant angle of incidence between the laser and the surface of the part. In one example, a part having a contoured surface is rotated while simultaneously operating the laser in a coordinated movement that maintains the angle of incidence between the laser and the surface of the part. In some cases, the distance between the laser and the surface of the part is varied while maintaining other laser parameters to create a varied textured pattern.

In accordance with some embodiments, an optical scanning operation is used to provide feedback to a laser-based texturing process. For example, as described in more detail below, a laser raster scan may be used to measure the surface geometry of a region of the part to be textured. Based on the laser raster scan, laser texturing parameters, including, for example a laser texturing sequence or programming sequence may be created and used to form a customized textured pattern on the surface of the part. In some cases, the laser scan is used to create a simulated geometric model of the surface of the part. The simulated geometric model may include computer-generated surface geometry, computer-generated solid geometry, point geometry, or other computer-generated geometric features.

In one example, a texturing sequence may be created based on the optical scan, where the texturing sequence adapts the laser-based texturing process to account for variations or irregularities in the height of the surface of the part. Similarly, the optical scan may be used to account for variations or irregularities in the contour of the surface of the part. Additionally, the optical scan may be used to register or locate the textured pattern with respect to a feature or pattern already formed into the surface of the part. Thus, the system and techniques described herein may also be used to create a customized textured pattern that accounts for particular surface geometry of the part being processed.

In some embodiments, further processing is performed on the surface of the part. For example, a laser coloring and an anodizing process may be combined with a laser texturing process. In some cases, the laser scanning, laser texturing, and laser coloring processes are performed within a single system. In this case, either the laser texturing or laser coloring processes may be adapted to conform to the surface geometry of the part.

While many of the following examples are provided with respect to the creation of a textured pattern, it is not necessary that the systems and techniques be limited to only include texturing applications. In particular, the systems and many of the techniques described herein can also be applied to other types of features formed using a laser. For example, the techniques discussed herein may be applied to create a laser-colored feature, a laser-machined feature, or other types of features that can be formed into the surface of a part using a laser.

1. Example Part Having a Textured Pattern

FIG. 1A depicts an example part having a textured pattern formed on an external surface. In this example, the part 100 is an optical mouse with a textured pattern 110 formed around the perimeter of a top surface 101 of the part 100. As shown in FIG. 1A, the top surface 101 of the part 100 is contoured in shape. In this example, the top surface 101 has a generally convex contour shape and is also rounded along the edges. However, the geometry depicted in FIG. 1A is merely an example and the techniques described herein may be applied to parts having other types of contoured shapes, to parts having flat shapes, and to parts having a combination of contoured and flat shapes.

As shown in FIG. 1A, the textured pattern 110 is continuous around the perimeter of the top surface 101 and substantially uniform throughout the textured pattern 110. In other examples, another type of textured pattern may vary in texture, shape, or size over the surface of the part 100. Also, another type of textured pattern may include one or more gaps or breaks in the pattern. The techniques described herein can be used to form a variety of types of laser-based textures to form textured patterns having different types of textures and patterns, such as letters, symbols, or other identifiers formed into the surface of the part.

Figure 1B:
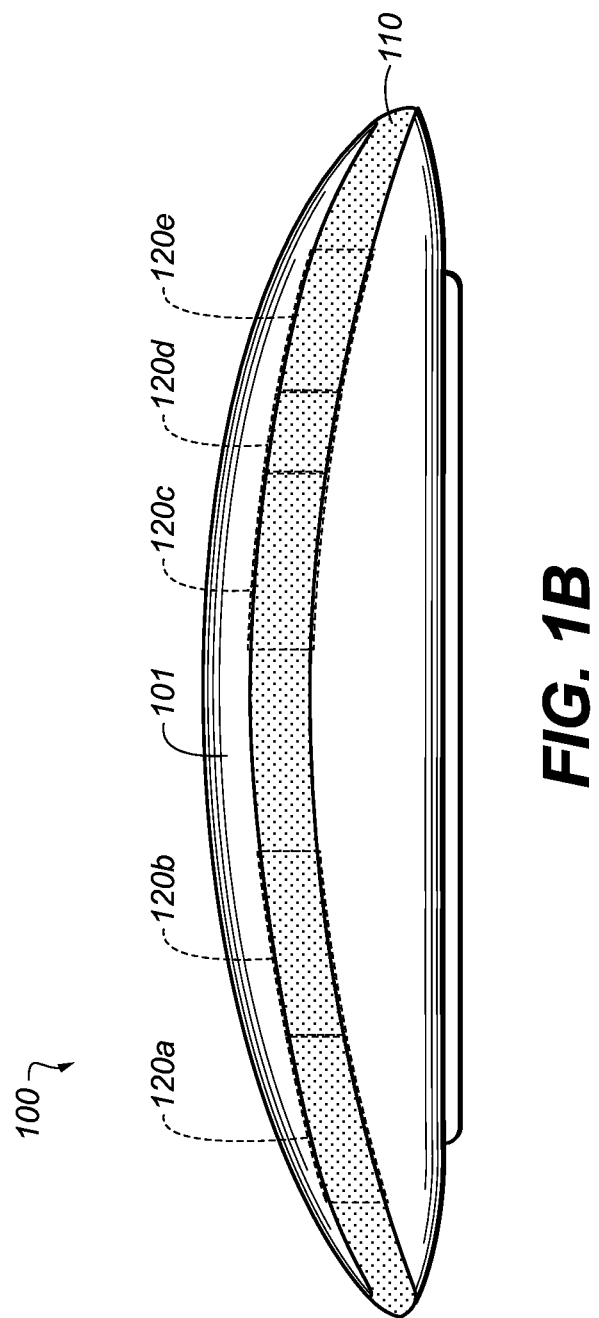
FIG. 1B depicts a side view of an example part having a textured surface.

FIG. 1B depicts a side view of part 100 having a textured pattern 110. As shown in FIG. 1B, portions of the textured pattern 110 extend around the edge of the part 100. Due to the size and complexity of the contour of the surface 101, using some traditional texturing techniques, it may not be possible to form a continuous textured pattern 110, as depicted in FIG. 1A-B. For example, using some traditional techniques in which the scan area of the laser is limited, a large textured pattern would need to be formed as multiple individual sections. For example, using a traditional step-and-pattern operation, the part or work piece could be placed in a first location to form one individual textured pattern and then moved or re-fixtured before forming a subsequent, adjacent textured pattern. Using such techniques, it may be difficult or impossible to register or locate the part with sufficient precision to create a single, uniform continuous pattern that is free from seams or discontinuities between the individual portions.

Using the systems and techniques described below with respect to FIGS. 2A-B, 3A-C, 4 and 5A-D, difficulties or drawbacks with some traditional techniques may be reduced or eliminated. In particular, a uniform continuous textured pattern 110 can be formed over the surface of a part 100 having a complex surface 101 without creating seams or other visual abnormalities within the textured pattern 110. As described in more detail below, a laser-based texture operation may be performed on multiple regions of the part 100. Seamless transitions between the multiple regions may be accomplished by rotating either the part 100 or the laser mechanism with respect to each other.

As shown in FIG. 1B, by way of one example, a first or initial textured pattern 120*a* may be formed on a corresponding first region on the surface 101 of the part 100. A subsequent or second textured pattern 120*b* may be formed on a corresponding second region, that is immediately adjacent to the first region. To create a seamless transition from the first textured pattern to the second textured pattern, the part 100 (or the laser) may be rotated about an axis while a portion of the first or second patterns are being formed using the laser. In some cases, the one or both of the textured patterns are being formed simultaneous to the rotation of the part 100 (or the laser). With respect to the present example, the axis of rotation may be approximately parallel or substantially aligned with the portion of the surface on which the textured pattern is being applied. In such a case, the part 100 (or laser) may be rotated while the laser is passed across the surface 101 of the part 100 forming an end portion of the first textured pattern. The part 100 (or laser) may continue to be rotated while the laser is passed across the surface 101 of the part 100 forming the beginning portion of the second textured pattern. Thus, in this example, the part 100 (or laser) is rotated while the adjoining portions of the first and second textured patterns are being formed with the laser.

As shown in FIG. 1B, by way of another example, two textured patterns 120*c* and 120*e* may be formed on either side of a third transition textured pattern 120*d*. The transition textured pattern 102*d* may be formed while the part 100 (or laser) is being rotated in order to create a seamless transition between the two textured patterns 102*c* and 120*e*. As in the other example provided above, the axis of rotation may be approximately parallel or substantially aligned with the portion of the surface on which the textured pattern is being applied.

In one example, the first textured pattern 120*c* may be formed while the part 100 is stationary. After finishing the first textured pattern 120*c* and beginning to form the transition textured pattern 120*d*, the part (or laser) may begin to rotate about an axis. The rotation may continue as the textured pattern 120*c* is being formed with the laser. Near the end of forming the transition textured pattern 120*d*, the rotation may stop and the part may remain stationary as the second textured pattern 120*e* is being formed. Thus, in this particular example, the part (or laser) are only rotated while the transition textured pattern is being formed 120*c*. If the laser texturing process is continuous while forming the first transition, and second textured patterns, a seamless, substantially uniform continuous textured pattern 110 may be formed on the surface 101 of the part 100.

In another example, the part (or laser) is continuously rotated while forming the first 120*c*, transition 120*d*, and second 120*e* textured patterns. Other sequences of stationary operations and coordinated rotation operations may also be performed to achieve a substantially uniform continuous textured pattern 110. Additionally, rotation may occur around more than one axis for a sequence of operations. Also, the axis of rotation may be variable and the part 100 (or laser) may rotate around a variable, virtual pivot or axis.

The following example is provided with respect to one side of the part 100, as shown in FIG. 1B. However, similar techniques may be applied for other regions on the part 100 or for the entire part 100. In fact, using one or more of the example sequences described above, the continuous textured pattern 110 depicted in FIGS. 1A-B may be formed around the perimeter of the surface 101 in a single, continuous laser texturing sequence. In some cases, the continuous textured pattern 110 is substantially free of seams, transitions or other visual discontinuities. However, because the continuous textured pattern 110 forms a complete loop, there may be a single seam corresponding to the beginning/end of the laser texturing process.

2. Example Systems for Producing a Part Having a Textured Pattern

Figure 2A:
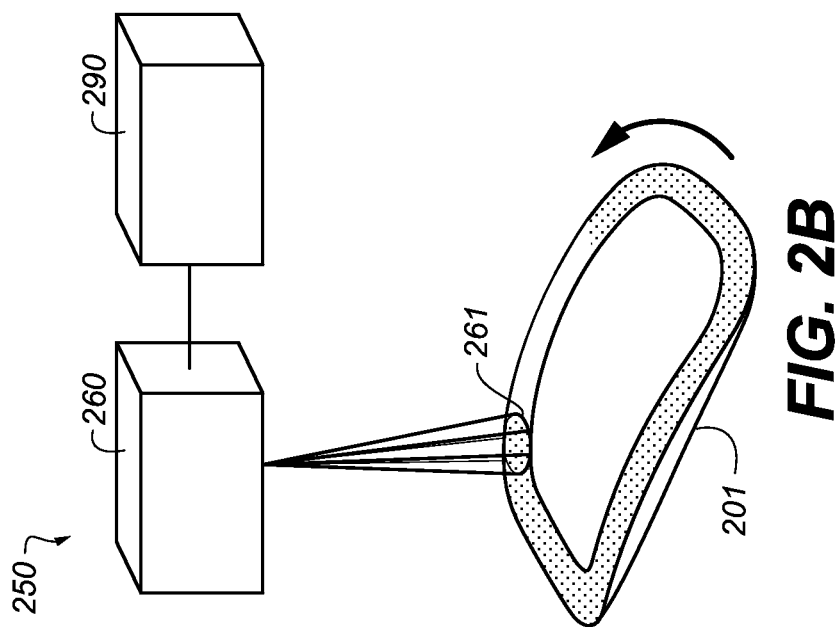
FIGS. 2A-B depict example systems for producing a part having a textured pattern.
Figure 2B:
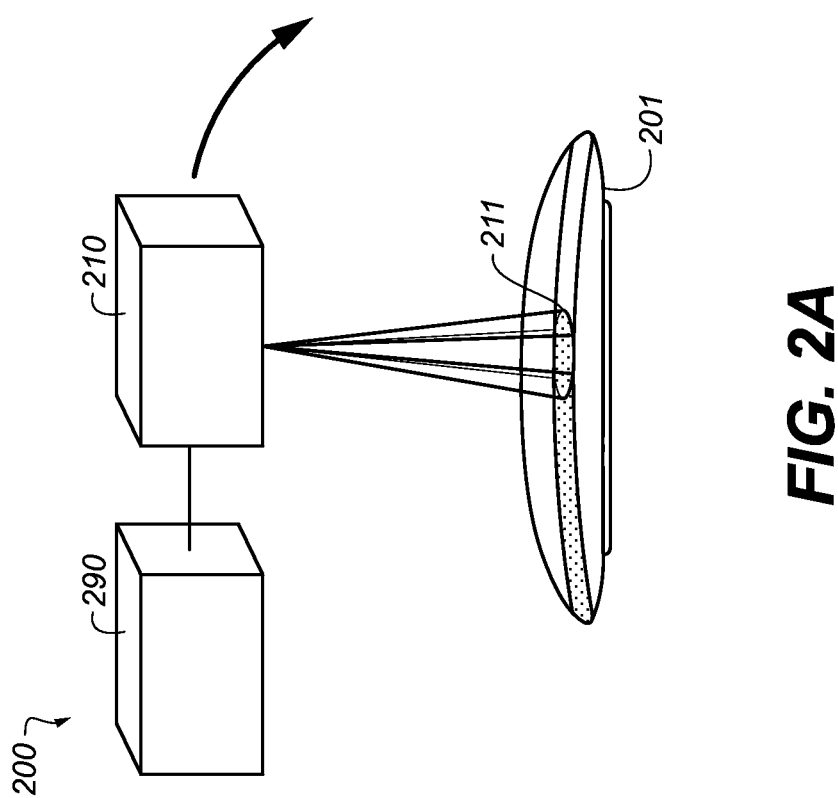

FIGS. 2A-B depict example systems for producing a part having a textured surface. FIG. 2A depicts a simplified version of a system 200 that includes a laser mechanism 210 for forming a textured pattern on a part 201. Similarly, FIG. 2B depicts a simplified version of another system 250 that includes a laser mechanism 260 for forming a textured pattern on a part 201. Either of the laser mechanisms 210, 260 may be ablation laser mechanisms that can be used ablate the surface of a part to create a series of texture features.

As shown in FIG. 2A, the laser mechanism 210 is able to produce a textured pattern over a limited area, as indicated by the scan area 211. Similarly, the laser mechanism 260 is able to produce a textured pattern over a scan area 261. The size of the scan areas 211 and 261 may be dependent on the optical characteristics of the laser mechanism and the physical layout of the system. As shown in FIGS. 2A and 2B, the scan areas 211 and 261 are smaller than the part 201 on which the textured pattern is being applied. Therefore, to produce a textured pattern that is larger than the scan area (211, 261) either the part 201, the laser mechanism (210, 260) or both must be moved with respect to each other.

In the system 200 depicted in FIG. 2A, the laser mechanism 210 may be rotated about an axis with respect to the part 201. In accordance with some embodiments described herein, a laser texturing operation may be performed while the laser mechanism 210 is being rotated to produce a continuous textured pattern that is larger than the scan area 211 associated with the laser mechanism 210. In some examples, the movement of the laser beam provided by the laser mechanism 210 is coordinated with the rotation of the laser mechanism 210 to produce a continuous textured pattern that may be substantially uniform and free from seams or visual discontinuities. In some cases, the laser mechanism 210 is operated simultaneously and coordinated with the rotation of the laser mechanism 210 to produce a continuous textured pattern over the surface of the part 201.

In some cases, the laser mechanism 210 is configured to be rotated completely around the part 201 and may be able to create a single continuous textured pattern that encircles the entire part 210. As shown in FIG. 2A, the laser mechanism 210 may be rotated to form a textured pattern that extends around the perimeter of the part 201, similar to the example provided above with respect to FIGS. 1A-B. As mentioned previously, the pattern may be formed around the perimeter of the part 201 without using a step-and-pattern operation. For example, substantially all of the textured pattern may be formed without stopping or pausing the operation of the laser mechanism 210.

In some cases, the laser mechanism 210 is able to rotate around more than one axis. For example, the laser mechanism 210 may be connected to a linkage that provides rotation about a variable or shifting virtual pivot axis. In some cases, the part 201 remains fixed while the laser mechanism 210 is rotated and in other cases the part 201 may also be rotated or may be translated with respect to the laser mechanism 210.

Similarly, in the system 250 depicted in FIG. 2B, the part 201 may be rotated about an axis with respect to the laser mechanism 260. In accordance with some embodiments described herein, a laser texturing operation may be performed while the part 201 is being rotated to produce a continuous textured pattern that is larger than the scan area 261 associated with the laser mechanism 260. In some examples, the movement of the laser beam provided by the laser mechanism 260 is coordinated with the rotation of the part 201 to produce a continuous textured pattern that may be substantially uniform and free from seams or visual discontinuities.

Similar to as discussed above with respect to system 200, the rotation of the part 201 in system 250 may be performed in a variety of ways. The rotation may be about a single axis or may be about a variable or shifting pivot axis provided by a linkage or equivalent mechanism. Also, while FIG. 2B depicts the part 201 as rotating, the laser mechanism 260 may also be translated and/or rotated with respect to the part 201.

In either system 200 of FIG. 2A or system 250 of FIG. 2B, the motion of the part or laser mechanism may be coordinated with a texturing operation to provide an extended continuous textured pattern. In one non-limited example, both the laser mechanisms 210 and 260 are laser ablation texturing mechanisms that are configured to direct a laser beam over the respective scan areas 211 and 261. The laser beam may be directed steered using, for example, one or more movable mirrors and other optical elements. In one example, each laser mechanism 210 and 260 includes a pair of movable mirrors that are positioned using a pair of servo-controlled galvanometers. In some cases, the laser mechanisms 210 and 260 are configured to provide a raster scan over the respective scan area 211 and 261 to ablate the surface of the part 201 to produce a textured surface. In either system (200, 250), a computer controller 290 may be used to coordinate the scanning motion of the servo-controlled galvanometer mirrors with the rotation of the part 201 or the rotation of the laser mechanism 210. In some cases, the laser mechanism 210 (or 260) are operated simultaneously with the rotation of the part 201 (or laser mechanism 210) to form a continuous textured pattern. The computer controller 290 includes a computer processor for executing computer-readable instructions that may be stored on a non-transitory computer-readable media, such as RAM, ROM, EPROM, magnetic media, solid state media, or other form of computer data storage. The computer controller 290 may be configurable to perform, for example, the processes 500, 530, and 550 described below with respect to FIGS. 5A-D.

The systems 200 and 250 of FIGS. 2A-B can be used to provide a textured pattern over a variety of parts having a wide variety of contour surface shapes. The systems 200 and 250 may also be combined with other components or subsystems to further improve the versatility of the texturing operations that can be performed. As explained in more detail below with respect to FIG. 4, a texturing system may also include one or more optical sensors configured to provide information about the surface geometry of the part that may be used to improve the texturing process. Such systems may be particularly beneficial when texturing parts that have a variable shape or surface features with a shape that is difficult to predict. Such systems may also be beneficial for locating or registering a textured pattern with respect to features that have already been formed within the part.

Figure 3A:
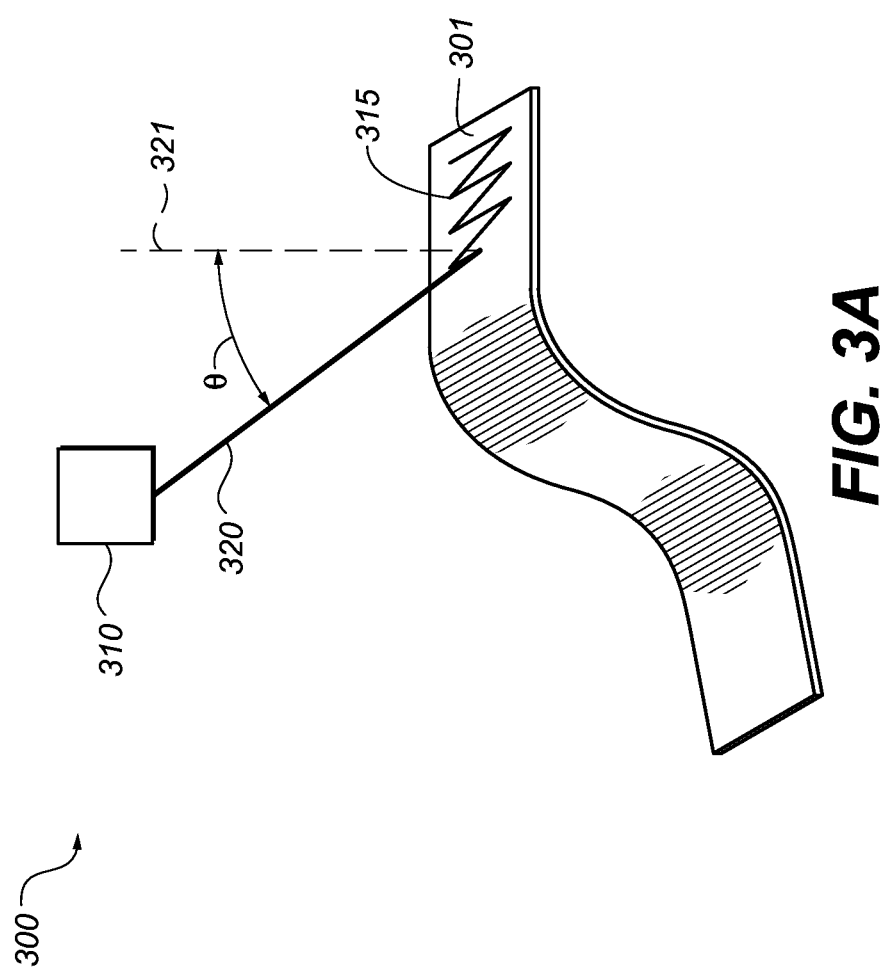
Figure 3C:
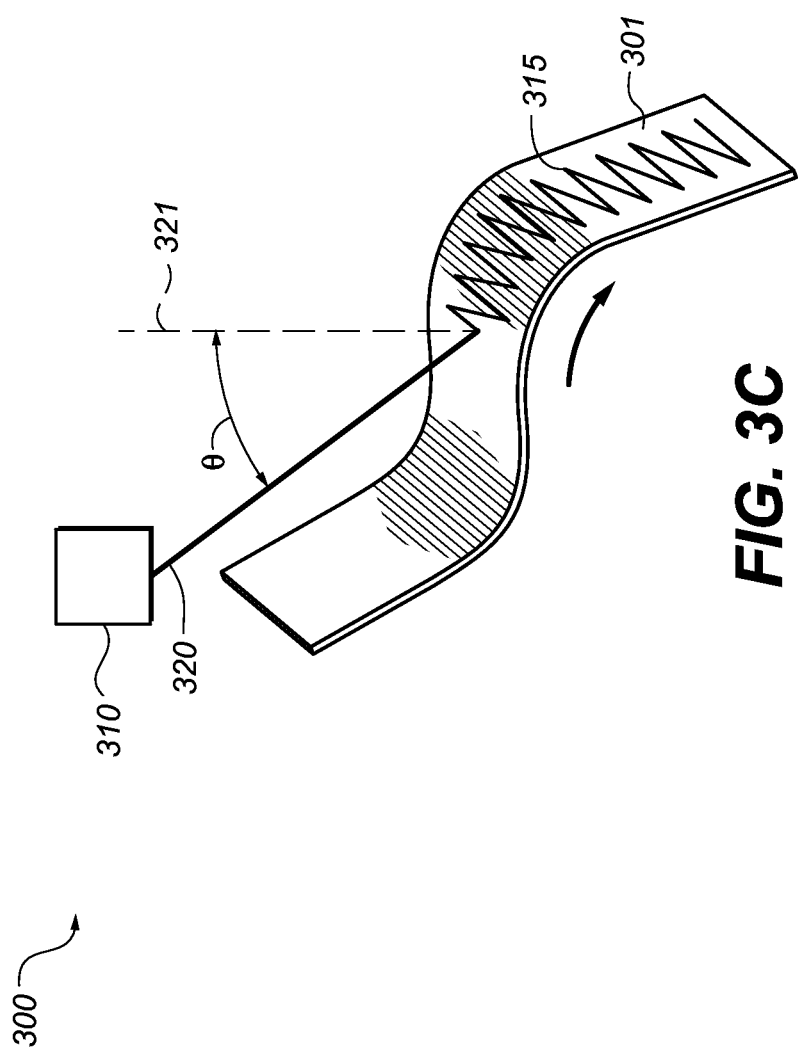

FIGS. 3A-C depict an example system for forming a laser pattern on a part at a uniform angle of incidence. Similar to the system described above with respect to FIGS. 2A-B, the system 300 of FIGS. 3A-C includes the capability of rotating the part, the laser, or both the part and the laser in order to form a laser-based feature. Also, as described above, by rotating the part while simultaneously forming a laser feature, the system 300 can be used to form an extended feature or textured pattern over the surface of a part.

More specifically, FIGS. 3A-C also depict how the angle of incidence of a laser with respect to the surface of a part can be maintained at a substantially constant angle while forming the textured pattern or other laser-based feature. As shown in FIG. 3A, a laser mechanism 310 is used to produce a laser beam 320 that is incident on a contoured surface 301 of a part. The laser beam 320 is used to create a textured pattern 315, which is depicted as a two-dimensional raster scan in FIG. 3A. As shown in FIG. 3A, the laser beam 320 is at an angle of incidence $\theta$ with respect to the surface normal 321.

As depicted in FIGS. 3B-C, the angle of incidence of the laser beam 320 is maintained at a substantially constant angle as the textured pattern 315 is formed over the surface contoured surface 301. In particular, a computer controller (similar to as described above with respect to FIGS. 2A-B) may be used to coordinate the rotation of the surface 301 with respect to the formation of the textured pattern 315. As shown in FIG. 3B, the surface 301 has been rotated clockwise in accordance with the curvature of the surface 301 resulting in substantially the same angle of incidence $\theta$ as depicted in FIG. 3A. Similarly, as shown in FIG. 3C, the surface 301 has been rotated further due to the curvature of the surface 301 resulting in substantially the same angle of incidence $\theta$ as depicted in FIGS. 3A and 3B.

As shown in FIGS. 3A-C, as the part is rotated, the laser forms the textured pattern 315. In some cases, the operation of the laser mechanism 310 is simultaneous to and coordinated with the rotation of the surface 301 of the part to form a single, continuous textured pattern 315. In some cases, the textured pattern 315 is formed without using the step-and-pattern operation, described previously.

Additionally, in some cases, the distance between the surface 301 and the laser mechanism 310 may be varied to create a variable or changing textured pattern. In one example, the laser operating parameters may be maintained at a substantially constant state and the distance between the surface 301 and the laser mechanism 310 may be varied to increase or decrease the amount of laser energy incident on the surface 301 of the part. In this way, the depth or other quality of the textured pattern may be varied without varying or modifying another operating parameter of the laser mechanism 310.

While the example provided above with respect to FIGS. 3A-C is described with respect to the surface 301 of the part rotating with respect to the laser mechanism 310, in other examples, the laser mechanism 310 or both the laser mechanism 310 and the surface 301 of the part may be rotated to provide a substantially uniform angle of incidence as the laser operation is being performed.

Figure 4:
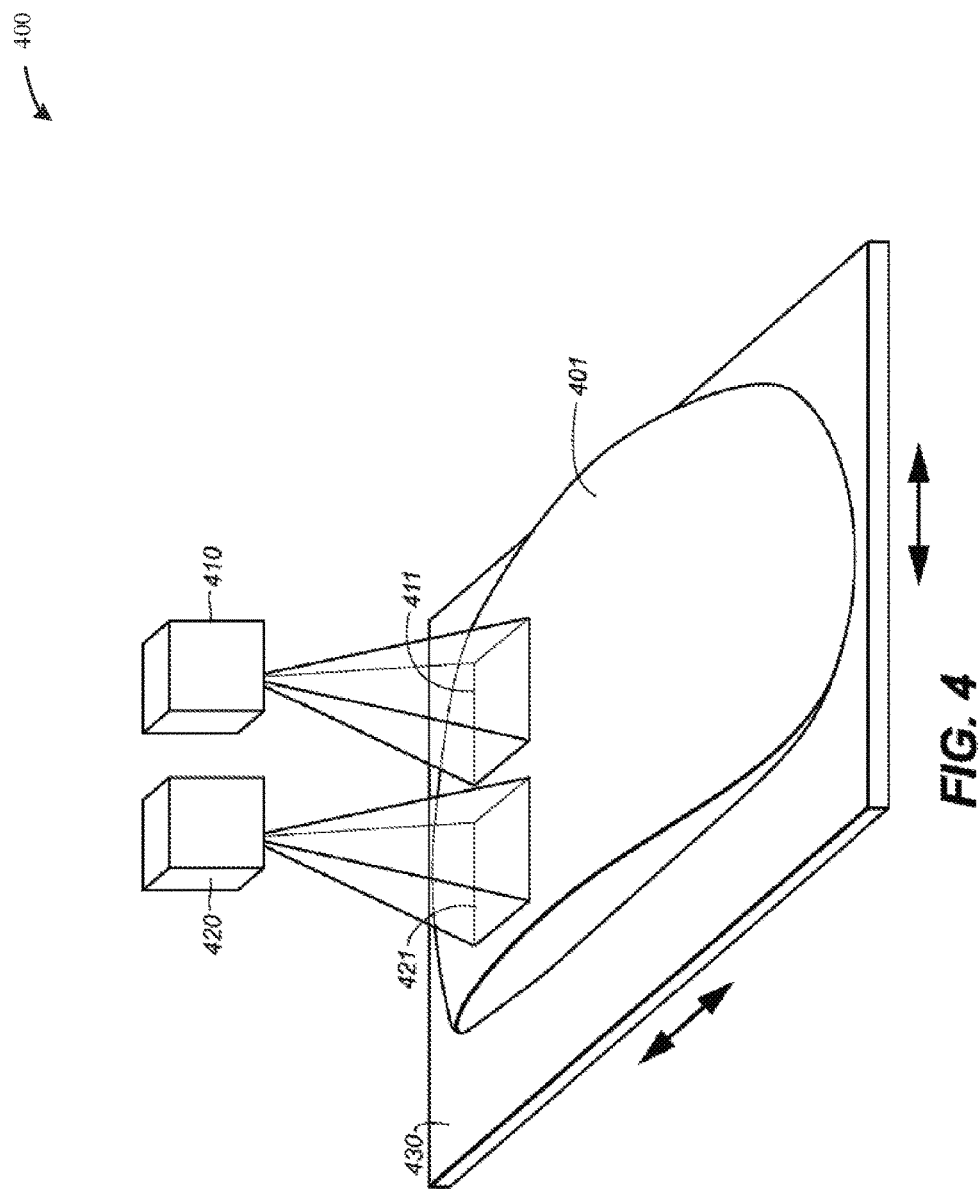
FIG. 4 depicts another example system for producing a part having a textured pattern.

FIG. 4 depicts another example system for producing a part having a textured surface. As shown in FIG. 4, the example system 400 includes a laser mechanism 410, an optical scanning mechanism 420 and a controller. The optical scanning mechanism 420 of system 400 can be used to scan the surface of a part before it is textured and may be referred to as simply a scanner mechanism 420 or a scanner 420. The controller may use information from the scan to create a simulated geometric model, one or more texturing parameters, or a customized texturing sequence based on the surface geometry of part 401. The laser mechanism 410 may then be used to produce a textured pattern in accordance with the geometric model, texturing parameters, or sequence.

In the present example, the system 400 includes a controller 490 for controlling the operation of the scanner mechanism 420 and the laser mechanism 410. The controller 490 may include a computer processor for executing computer-readable instructions. In some cases, the controller 490 includes a computer processor operatively coupled to other control circuitry or electronics. The controller 490 may also include one or more forms of non-transitory computer-readable medium, such as RAM, ROM, EPROM, magnetic media, solid state media, or other forms of computer data storage. Computer-readable instructions or one or more computer program products may be stored on the non-transitory computer-readable media. The controller 490 may also be configured for connection to a network, such as a LAN or the Internet. The computer controller 490 may be configurable to cause the system 400 to perform, for example, the processes 500, 530, and 550 described below with respect to FIGS. 5A-D.

In the present example, the system 400 includes a scanning mechanism 420 that can be used to detect and record information regarding the surface geometry of part 401. In one non-limiting example, the scanning mechanism includes a laser beam that can be directed or steered over the scan area 421. The laser may be steered using, for example, one or more movable mirrors mounted to one or more servo-controlled galvanometers. In one case, a first galvanometer is used to steer the laser along one direction (e.g., an X-direction) and a second galvanometer is used to steer the laser along a second direction (e.g., a Y-direction). Each galvanometer may be actuated using, for example, a specified drive frequency. By coordinating the actuation of the first and second galvanometers by, for example, using synchronized drive frequencies, a rectangular or raster scan can be per performed over the scan area 421. As the laser is scanned, light reflected off part 401 is received by one or more optical sensors within the scanning mechanism 420. The reflected beam may be used to measure a location of a point or area on the surface of the part 401. By detecting reflected light from a series of points located over the scan area 421, information about the surface geometry of the part 401 may be generated. Converting sensor information into digital data or a surface model of the part is sometimes referred to as digitizing the surface, and may be performed by the scanning mechanism 420 or by the controller 490.

In some examples, the scanning mechanism 420 uses a triangulation algorithm to estimate the location of a point on the surface of the part 401. Other techniques may also be used to estimate the location of a point, including, without limitation, structured light scans, laser interferometry, time of flight, LiDAR, and other optical imaging techniques.

Using a variety of techniques, the scan frequency and/or the scan resolution may be tailored to fit the laser texturing operations performed by the laser mechanism 410. For example, the scanning mechanism 420 may be configured to produce a digitized scan of the surface of the part 401 having a resolution that is no more than 2× the resolution of features that can be created using the laser mechanism 410. In some cases, the scanning mechanism 420 may produce a digitized scan that is no more than 10× the resolution of the laser mechanism 410.

As shown in FIG. 4, system 400 also includes a laser mechanism 410 positioned approximately adjacent to the scanning mechanism 420. In some cases, the location of the laser mechanism 410 is fixed at a known distance with respect to the scanning mechanism 420. Fixing the two mechanisms with respect to each other may facilitate a high-accuracy correlation between location of geometry measured during the scan and features created using the laser mechanism in a texturing operation. In some cases, a calibration routine is performed to determine the distance between, for example, an optical reference point in the scanning mechanism 420 with a corresponding optical reference point in the laser mechanism 410.

In the present non-limiting example, the laser mechanism 410 utilizes an ablating laser beam that is directed over a scan area 411. In the present example the scan area 421 associated with the scanning mechanism 420 is approximately adjacent to the scan area 411 associated with the laser mechanism 410. In the present example, the laser mechanism 410 is fixed with respect to the scanning mechanism 420. However, in other examples, either of the components may be movable or adjustable with respect to each other.

As discussed above with respect to previous examples, the laser mechanism 410 may include one or more mirrors positioned using one or more servo-controlled galvanometers to steer the laser beam. In one non-limiting example, the laser mechanism 410 includes a first galvanometer that is used to steer the laser along one direction (e.g., an X-direction) and a second galvanometer is used to steer the laser along a second direction (e.g., a Y-direction). By coordinating the movement of the first and second galvanometers, a rectangular or raster scan can be per performed over the scan area 411. The operation of the laser mechanism 410 is controlled by controller 490, which may be configured to vary the location of the laser beam, laser power, laser pulse duration, and other laser parameters. These parameters may be configured to adapt the location of the ablations, the depth of the ablations, and/or the geometry of the ablations used to create the textured pattern. A more detailed description of example laser texturing is provided below with respect to FIGS. 6-8.

In some examples, the laser mechanism 410 may also include a laser beam that is configured to change the color of the surface of the part 401. For example, the laser mechanism 410 may be configured to produce a laser beam that alters the light reflecting properties of the part material. In some cases, the altered light reflecting properties cause the color of the surface of the part 401 to become either darker or lighter due to the amount of light that is reflected. Similarly, the laser beam may be configured to change the specular or diffuse nature of the surface finish of the part 401, which may also have an impact on the reflected light or color of the surface of the part 401.

Additionally, in some cases, the laser mechanism 410 may also be configured to produce a black-marked or white-marked feature or region on the surface of the part 401. In one example, the laser mechanism 410 is configured to change the color of an aluminum part by creating a localized heated region. In some cases, the laser mechanism 410 can be used to heat or melt a localized region of the aluminum on the surface of the part 401, which may cause an oxidation process to occur over that region. Depending on the type of aluminum or metal alloy used and the parameters of the laser, the oxidation process may create a darkened or black-marked region. In some cases, the oxidation process creates a lightened or white-marked region. In some cases, the black-marked or white-marked region is formed on a part that has been anodized or coated without significantly affecting the anodized coating. For example, in some circumstances, the laser marking may be performed by focusing a laser below the anodized layer to create a black-marked or white-marked region below the anodized layer.

Additionally, in some cases, the laser mechanism 410 may also be configured to produce a surface finish feature on the surface of the part 401. In one example, the laser mechanism 410 is configured to ablate or melt light diffusing features from the surface of the part 401 to modify the specular properties of the surface. Similarly, the laser mechanism 410 may be used to reduce the specular properties of the surface by melting or ablating a fine light-diffusing pattern into the surface of the part.

As shown in FIG. 4, the system 400 also includes a positioner 430 for positioning the part 401 with respect to the scanning mechanism 420 and the laser mechanism 410. The positioner 430 may include one or more servo-controlled motion stages which may be configured to provide controlled and guided motion along one or more axes. For example, the positioner 430 may include an X and Y linear stage and one or more rotational stages for manipulating the part 401 with respect to the scanning mechanism 420 and laser mechanism 410. The positioner 430 may be controlled, in part, by the controller 490. The positioner 430 may also include internal electronics for driving one or more servo motors in the one or more motion stages.

Generally, the positioner 430 is used to move a region on the surface of the part 401 first past the scan area 421 associated with the scanning mechanism 430 and then past the scan area 411 associated with the laser mechanism 410. In one example, the part 401 is translated through the system 400 from left to right and passed under the scan areas 421 and 411 associated with the scanning mechanism 420 and the laser mechanism 410, respectively. As the part 401 is translated, a region on the surface of the part 401 may first be scanned by the scanning mechanism 420. Information about the surface geometry if the part 401 may be transmitted to the controller 490 and a customized texturing sequence or texturing parameters may be computed or determined. As the same region of the surface of the part 401 is passed under the scan area 411, a customized texturing operation may be performed based on the customized texturing sequence or parameters using the laser mechanism 410.

Similar to, as described above, with respect to system 250 of FIG. 2B, the part 401 in system 400 may be rotated in a coordinated motion with the laser texturing performed by the laser mechanism 410 to create an extended continuous textured pattern. Additionally, the part may be translated, or rotated and translated in a coordinated motion with the laser texturing to produce an extended continuous textured pattern. In some cases, depending on the degrees of freedom of the positioner 430, the entire surface of the part 110 can be scanned and textured using system 400.

Similar to as described above with respect to system 200 of FIG. 2A, the laser mechanism 410 of system 400 may be rotated with respect to the part 401 in a coordinated motion with the laser texturing performed by the laser mechanism 410 to create an extended continuous textured pattern. In an alternative embodiment, the laser mechanism 410 and/or the scanning mechanism 420 may be translated and rotated with respect to the part 401 to create an extended textured pattern on the surface of the part 401.

3. Example Processes for Producing a Part Having a Textured Pattern

FIGS. 5A-D depict flow charts of example processes for producing a part having a textured surface or other laser-created feature. The example processes of FIGS. 5A-D may be used to produce a textured part, as discussed above with respect to FIGS. 1A-B. The example processes may also be used in conjunction with other surface treatment operations or manufacturing processes to produce a final or finished part.

Figure 5A:
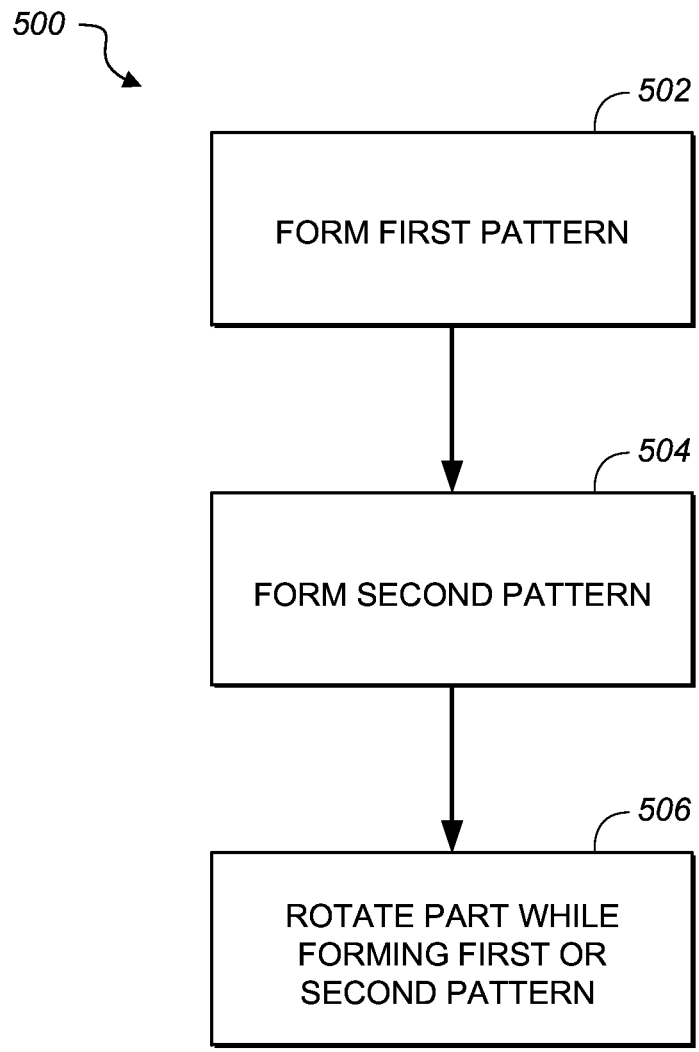
FIGS. 5A-D depict flow charts of example processes for producing a part having a textured surface.

FIG. 5A depicts an example process 500 for producing a textured pattern on a surface of a part. In some cases, process 500 can be used to create a continuous and substantially uniform textured pattern over a surface. Process 500 may be performed using any one of the systems 200, 250, or 400 discussed above with respect to FIGS. 2A, 2B, 3A-C, and 4.

In operation 502, a first textured pattern is formed. In particular, a first textured pattern is formed on a first region of the surface of a part. The textured pattern may be formed using a directed laser beam to ablate the surface of the part and create a depression, void, or other visible feature. A more detailed description of the patterning process is provided below with respect to FIGS. 6-8. In one example, a laser mechanism is used to direct a laser beam across the surface of the part in a raster-scan pattern. Any textured pattern may be formed, for example, by pulsing the laser power as the beam is traversed across the surface. Operation 502 may be performed using any one of the systems 200, 250, 300, or 400 discussed above with respect to FIGS. 2A, 2B, 3A-C, and 4. In one example, operation 502 is performed while the part and/or the laser mechanism remains stationary. In another example, operation 502 is performed while either the part and/or the laser mechanism is translated and/or rotated.

In operation 504, a second textured pattern is formed. In particular, a second textured pattern is formed on a second region on the surface of the part. In one example, the second region is directly or substantially adjacent to the first region. The textured pattern may be formed using a similar technique used in operation 502. If the textured pattern is going to be substantially uniform, the texturing parameters and texturing sequence may be substantially the same as those used in operation 502.

In operation 506, the part is rotated while forming part of the first or second textured patterns. In particular, the part is rotated while forming one or both of the patterns in operations 502 and 504 to create a seamless transition between the two textured patterns. In one example, the part begins to rotate as the end of the first pattern is being formed, in accordance with operation 502. In some cases, the part continues to rotate as the creation of the first textured pattern is completed and the second textured pattern is initiated. In some cases, the rotation occurs only during the creation of either the first or second textured patterns.

In some cases, operation 506 is performed as a simultaneous, coordinated movement of the laser mechanism passing the laser across the surface of the part and the rotation of the part under the laser beam. By coordinating the movement for at least the transition between the first and second textured patterns, a continuous, seamless, and substantially uniform textured pattern may be created.

In an alternative embodiment of operation 506, the laser mechanism is rotated and the part remains stationary. That is, the laser mechanism is rotated while forming one or both of the patterns in operations 502 and 504 to create a seamless transition between the two textured patterns. Additionally, in some embodiments, the part, the laser mechanism, or both are translated and/or rotated while forming a portion of either the first or second textured patterns to facilitate the creation of a seamless transition between the two textured patterns.

Figure 5B:
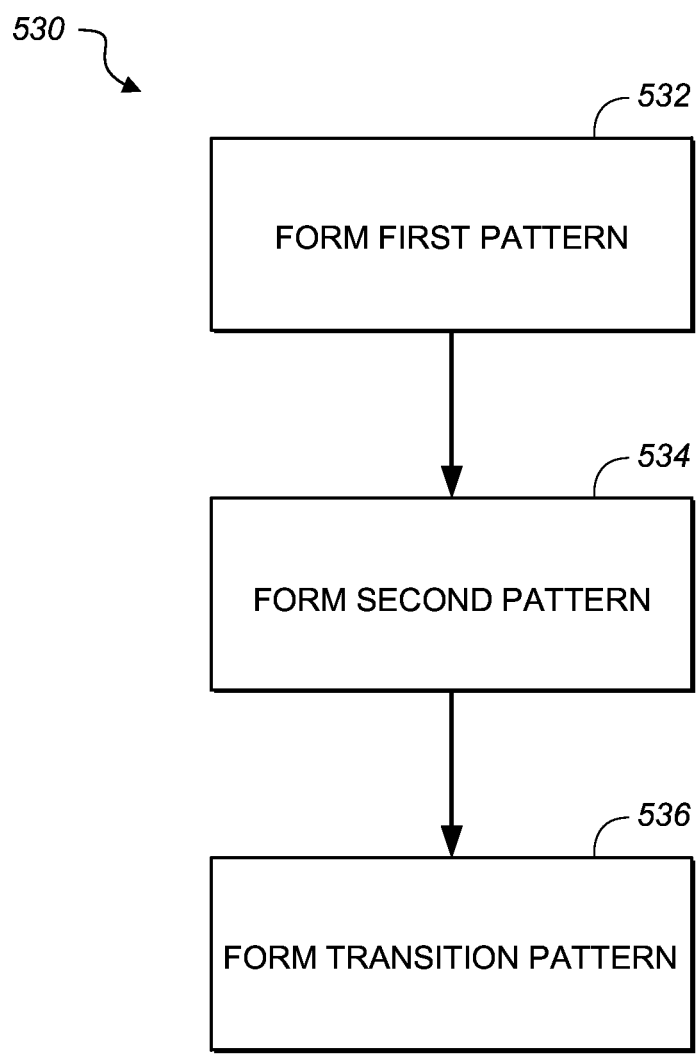

FIG. 5B depicts another example process 530 for producing a textured pattern on a surface of a part. In some cases, process 530 can be used to create a continuous and substantially uniform textured pattern over a surface. Process 530 may be performed using any one of the systems 200, 250, 300, or 400 discussed above with respect to FIGS. 2A, 2B, 3A-C, and 4.

In operation 532, a first textured pattern is formed. Operation 532 may be performed in a similar fashion to operation 502 of process 500, discussed above. In particular, a first textured pattern may be formed on a first region of the surface of a part using a laser mechanism and an ablating laser beam.

In operation 534, a second textured pattern is formed. Operation 534 may be performed in a similar fashion to operation 504 of process 500, discussed above. In particular, a second textured pattern may be formed on a second region of the surface of a part using a laser mechanism and an ablating laser beam. In some cases, the second region may be substantially adjacent or near the first region of operation 532. In some cases, the second region is separated from the first region by a transition region connecting the first and second regions.

In operation 536, a transition textured pattern is formed. In particular, a transition textured pattern may be formed between the first and second textured patterns using the laser beam produced by a laser mechanism. In some cases, the transition textured pattern is formed by rotating the part while passing the laser beam across the surface of the part. In some cases, operation 536 is performed as a simultaneous, coordinated movement of the laser mechanism passing the laser across the surface of the part and the rotation of the part under the laser beam. By coordinating the movement for at least the creation of the transition textured pattern, a continuous, seamless, and substantially uniform textured pattern may be created.

In an alternative embodiment of operation 536, the laser mechanism is rotated and the part remains stationary. That is, the laser mechanism is rotated while forming the transition textured pattern to create a seamless transition between the first and second textured patterns. Additionally, in some embodiments, the part, the laser mechanism, or both are translated and/or rotated while forming the transition textured pattern to facilitate the creation of a seamless transition.

Figure 5C:
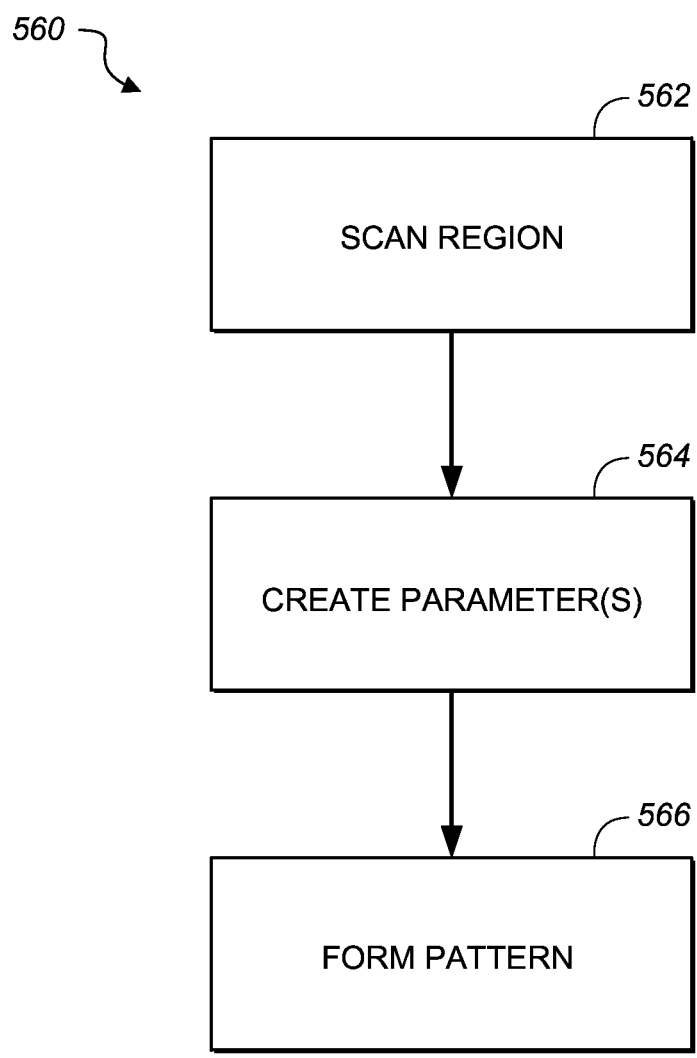

FIG. 5C depicts a flow chart of another example process for producing a part having a textured surface. In some cases, process 560 can be used to create a continuous and substantially uniform textured pattern over a surface. In some cases, process 560 may also be used to create a textured pattern that is customized or adapted to conform to the surface geometry of the part. Process 560 may be performed, for example using systems 400 discussed above with respect to FIG. 4.

In operation 562, a first region of the surface is scanned. In one example, the first region of the surface may be scanned using a laser beam produced using scanning mechanism. As discussed above with respect to FIG. 4, a scanning mechanism may be used to perform a rectangular or raster-type scan over the surface of the part. In some cases, the reflection of the laser beam is captured by an optical sensor and used to detect and measure a point or region of the scanned surface. As discussed above with respect to FIG. 4, a variety of techniques can be used to scan the surface of the part, including, without limitation, triangulation measurements, structured light scanning, laser interferometry, time of flight measurements, LiDAR, and other optical imaging techniques.

In some cases, the signals produced by the scanner sensor are converted into digital data or a digital surface model of the part. The signal to digital conversion may be performed by a processor associated with the scanning mechanism or with a separate controller. In some cases, the digital representation of the scanned surface is referred to as a digitized surface or digitized model.

In operation 564, a simulated geometric model or one or more laser texturing parameters are created. In one example, the information from the scan is used to create a simulated geometric model that corresponds to the surface of the part. As discussed previously, the simulated geometric model may include computer-generated surface geometry, computer-generated solid geometry, point geometry, or other computer-generated geometric features. In some cases, the simulated geometry model is stored in computer memory as a computer assisted design (CAD) file in one of a variety of file formats. For example, the simulated geometry model may be stored as a DXF, STEP, DWG, or other type of formatted file.

In some cases, one or more laser texturing parameters, including, for example, a laser texturing sequence, may be created based on the scan of the first region. In one example, the laser texturing parameters are created based on the simulated geometric model. In another example, the laser texturing parameters may be generated without generating a simulated geometric model. In one example, the scan of the first region performed in operation 562 is used to identify geometry in the first region. In some cases, the laser texturing parameters or laser texturing sequence is created or adapted based on the geometry identified in the scan. For example, the laser texturing sequence may be customized or adapted to conform with the geometric features identified from the scan of operation 562. Adapting the laser texturing sequence may be advantageous by providing a variation in the depth, location, or other aspect of the laser texturing operation to account for variations in the actual surface geometry.

The one or more laser texturing parameters that are created in operation 564 may include laser operation conditions that are used to create a textured pattern on the surface of the part. For example, the laser texturing parameters may include a location or registration for the textured pattern to be created on the surface of the part. The texturing parameters may also include parameters for varying the depth or contour of the texture to be created to account for variations in the actual part. In some cases, the one or more laser texturing parameters created in operation 564 include a laser texturing sequence represented by instructions for ablating or cutting the surface of the part using a laser beam.

In one example, scan of the first region is used to determine a reference point within the first region. In this case, one or more laser texturing parameters may be created based on the reference point and the parameters may be used to register the textured pattern with respect to the reference point within the first region. Accordingly, the process 560 may be used to superimpose multiple patterns on the surface of the part without requiring precise complicated fixtures or physical registration techniques. Additionally, because a scanner-based registration may be performed with laser-based precision, the accuracy of the registration may be superior to physical registration or fixture-based techniques.

In operation 566, a textured pattern is formed. In particular, a textured pattern may be formed on the first region of the surface of the part using the laser beam of a laser mechanism. In one example, the part and/or the laser mechanism are positioned so that the scan area of the laser mechanism is aligned or overlaps with the first region of the part. The textured pattern may be formed in accordance with the laser texturing parameters created in operation 564. In particular, a textured pattern may be formed that is customized or adapted to conform to the surface geometry of the part measured in the scanning operation of 562. In one example, the location, the depth, or other parameter may be adapted in accordance with the laser texturing parameters to produce a textured pattern that accounts for variations or inconsistencies in the part geometry. Example textured patterns in accordance with operation 566 and process 560 are provided below with respect to FIGS. 6-8.

The examples provided above in processes 500, 530, and 560 are directed to the creation of textured pattern on the surface of a part. However, the techniques of those processes may also be applied to the creation of other laser-based features. For example, the techniques discussed above may be applied to a laser cutting or laser machining operation. In some examples, processes 500, 530, or 560 may be used to produce a recess, pocket or other type of surface feature using a laser or laser-based operation.

Figure 5D:
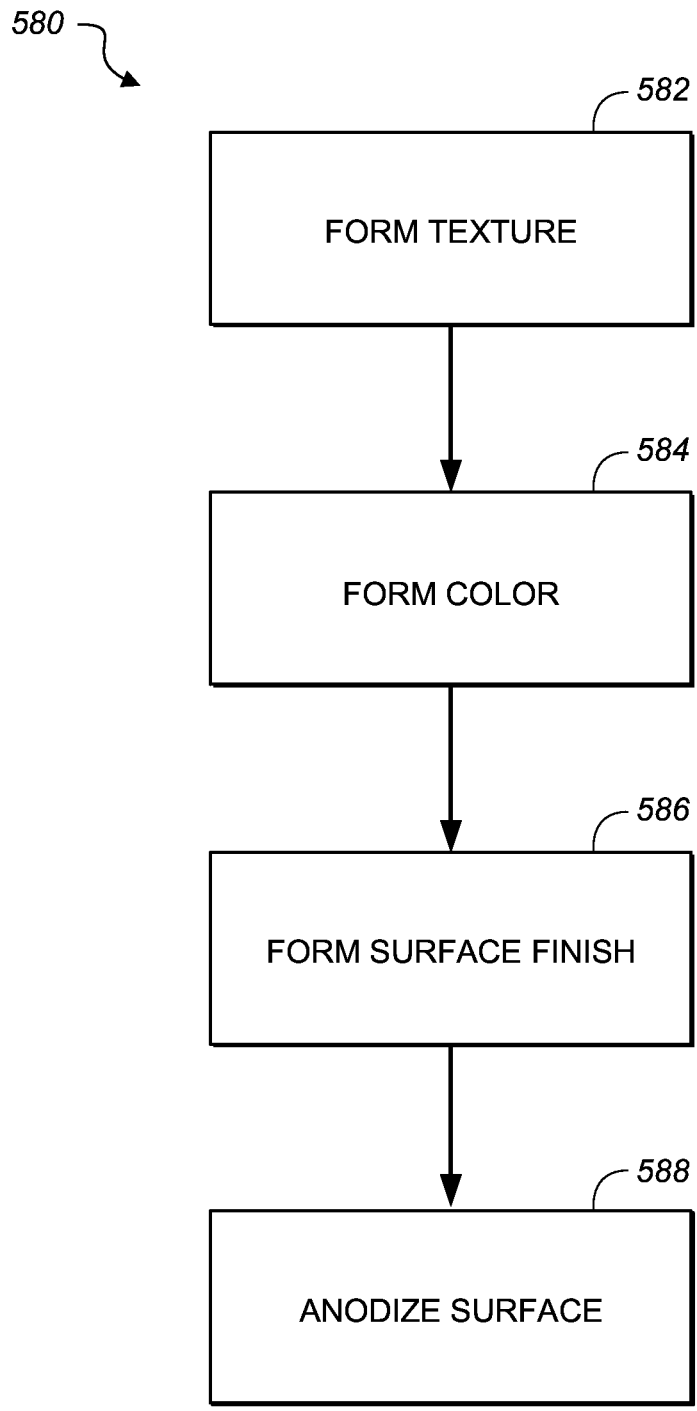

FIG. 5D depicts another example process 580 for producing a textured pattern on the surface of a part. Process 580 also provides an example of additional surfaces treatments that can be applied to the surface of the part. Example process 580 may be combined with any of the processes 500, 530, or 560 discussed with respect to FIGS. 5A-C, above. Portions of example process 580 may also be performed using any one of the systems 200, 250, 300, or 400 discussed above with respect to FIGS. 2A, 2B, 3A-C, and 4.

Example process 580 may be used in conjunction with one or more other manufacturing processes or operations. For example, a machining operation may be used to create a profile or contour shape for the part. For example, an end mill, ball mill, or other type of rotating cutting tool can be used to form an initial shape for the surface of the part. Other types of machining operations may also be used, including, for example, turning operations, drilling operations, electrical discharge machining (EDM), or other types of operations used to form the initial shape for the surface of the part. In some examples, a laser is used to machine an initial shape or surface of the part. The laser may machine the surface using an ablation or other material removal operation.

Before performing process 580, the surface of the part may also be treated using one or more blasting or polishing operations. In some embodiments, an abrasive polishing tool or sand blasting tool is used to create a desired surface finish on the surface of the part. In some embodiments, a laser is used to ablate or otherwise alter the surface of the part to achieve the desired surface finish. These operations and others may be performed before performing the operations of process 580.

With respect to process 580, in operation 582, a texture is formed on the surface of the part. In particular, a textured pattern may be formed on a first region of the surface of the part using a first laser-based process. The textured pattern may be formed by, for example, ablating portions of the surface of the part to form small texture features. In some cases the textured pattern may be based on a scan of the surface of the part. As discussed above with respect to FIG. 5C, a laser texturing feature may be formed in accordance with a set of parameters or be based on a digitized surface model created from a surface scan. Also, as discussed above with respect to FIGS. 5A-B, the part (or laser) may be rotated while the textured pattern is being formed to create a continuous laser pattern over a contoured surface or extended area of the part.

With respect to operation 582, various laser-based processes may be used to ablate, vaporize, melt or otherwise remove material from the surface to form the texture pattern. In some embodiments, a nanosecond, picosecond, or femtosecond laser may be used to form the texture pattern. As one non-limiting example, the laser employed to create patterns as described herein may have a focus of approximately 20-30 microns, a pulse width of 10 nanoseconds or less, and a frequency of about 100 kHz or greater. In some cases a laser having approximately a 1 micron wavelength is used. For example, a wavelength of 1064, 1030, of 1070 nanometers may be used depending on the laser configuration. It should be appreciated that any or all of these parameters may be changed as necessary. Embodiments may vary the pulse width (for example, between 5 and 20 nanoseconds, or more or less), repetition rate, spot or focus size and/or shape, the overlap and/or pattern formed through successive passes of the laser (one example of which may be a hatching pattern used to form raised texture features or larger texture features), the scan speed of the laser (which may be 1000 mm/sec or greater, and the laser frequency (which may be, as mentioned, from about 100 kHz or greater).

In operation 584, a colored pattern is formed on the surface of the part. In particular, a colored pattern may be formed using a second laser-based process that is configured to produce a color variation in the surface of the part. For example, in some cases, the laser may be configured to produce a laser beam that alters the light reflecting properties of the part material. In some cases, the altered light reflecting properties cause the color of the surface of the part to become either darker or lighter due to the amount of light that is reflected. Similarly, the laser beam may be configured to change the specular or diffuse nature of the surface finish of the part, which may also have an impact on the reflected light or color of the surface of the part. Additionally, as described above, the laser may be used to create a black-marked or white-marked region on the surface of the part. In some cases, the laser may be focused or directed below an anodized or top layer to form an oxide or colored region below the surface of the part.

With respect to operation 582, the laser-based process may be configured to heat or melt material from the surface to alter the color or appearance of the surface. In some embodiments, an infrared wavelength laser may be used, including, for example a picosecond pulsewidth infrared laser or nanosecond pulsewidth infrared laser. For example, one specific suitable laser is a 6 Watt infrared wavelength picosecond pulsewidth laser at 1000 KHz with a scan speed of 50 millimeters per second. Another example of a suitable alternative laser is a 10 Watt infrared wavelength nanosecond pulsewidth laser at 40 KHz with a scan speed of 20 millimeters per second.

In operation 586, a surface finish is formed on the surface of the part. Operation 586 may be optionally performed depending on the configuration of the final part. In some cases, the surface finish operation is performed over the same area as either the texture pattern or the color pattern. Alternatively, the surface finish operation may be performed on a different region of the surface of the part.

In some cases, a surface finish may be formed over a region on the surface of the part using a third laser-based process. By way of example, the laser-based process may be configured to ablate or melt small light-scattering surface features to change the specular properties of the surface. In one example, a laser-based polishing process may use laser light having a wavelength of approximately 1064 nanometers, a laser pulse duration of approximately 30 nanoseconds at approximately 7 Watts may be sufficiently long for thermally melting light scattering surface features. In another example, a laser having a pulse duration of approximately 200 nanoseconds at approximately 9 Watts; a repetition rate of approximately 500 kHz; and a scan rate if approximately 1000 millimeters per second at a scan line pitch of approximately 5 microns may be used. More generally, for a laser-melt polishing process, laser pulses may be used having a pulse width within a range from approximately 20 nanoseconds to approximately a microsecond or more.

In general, laser parameters, including, laser wavelength, laser power, laser pulse duration, or other parameters may be varied to produce the desired texture, color, or surface finish. In some cases, the same laser may be used to perform the two or more of the texturing, coloring, and/or surface finishing operations (582, 584, and 586) but the laser may be configured differently for each operation. In other cases, two or more different lasers are used to perform the operations described above. In some cases, two or more operations may be implemented using separate laser mechanisms. In some cases, the two or more separate lasers are integrated into the same laser mechanism.

In operation 588, the surface of the part is anodized. In one example, the part may be made from a material that is suitable for anodizing, including, without limitation, aluminum, titanium, zinc, or magnesium. The anodizing operation may be performed by electrically coupling the part to a current source and immersing the part in an electrolytic solution electrically coupled to another electrode. By passing a current through and the electrolytic solution an oxide layer may be formed on the surface of the part. The thickness of the coating and texture of the surface may be controlled by varying anodizing parameters, such as anodizing duration, drive current, and the type of electrolytic solution that is used. In some cases, the anodizing process includes a coloring process that uses a dye or color enhancing agent to color the oxidized layer of the part. In some cases, the anodizing process of operation 588 increases resistance to wear and corrosion. In some cases, the anodizing process is performed for cosmetic purposes.

In some cases, the anodization process of operation 588 may slightly alter the color or darkness of the surface of the part. For example, an anodized coating may result in the texture features or color features appearing slightly darker than had the surface not been anodized. Thus, in some cases, the parameters associated with the texture pattern formed in operation 582 or the color pattern created in operation 584 may be adjusted to compensate for a subsequent anodization operation. In particular, the texture pattern and/or the color pattern may be formed to be slightly lighter in color in order to compensate for any darkening that may occur due to the anodization operation 588.

Alternatively, the anodization operation 588 may be performed before the textured pattern operation 582 or before the color pattern operation 584. In particular, a laser may be used to form a textured pattern or color pattern on the surface of a part after it has been anodized. Also, as described above, a laser can be used to form a color feature on a surface after anodizing by, for example, focusing the laser below the anodized layer. On advantage to anodizing the surface before forming either texture features and/or color features, is that the final color and darkness of the texture features and/or color features may be less impacted by the anodization of the surface.

With regard to process 580, the order in which the operations are performed does not have to follow the sequence of the discussion above or the arrangement of the operations depicted in FIG. 5D.

4. Example Texturing Embodiments

Figure 6:
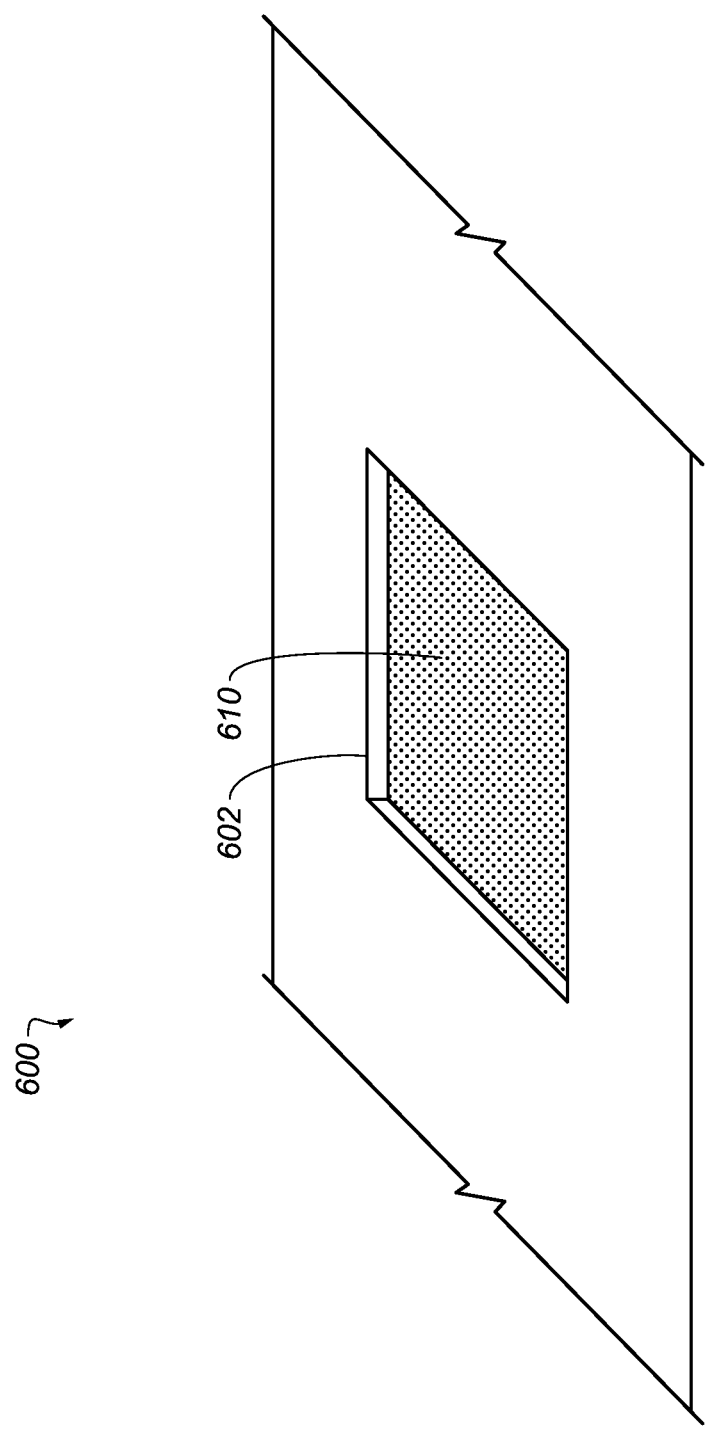
FIG. 6 depicts an example textured pattern formed on a surface of a part, the pattern being located with respect to an existing surface feature.
Figure 7:
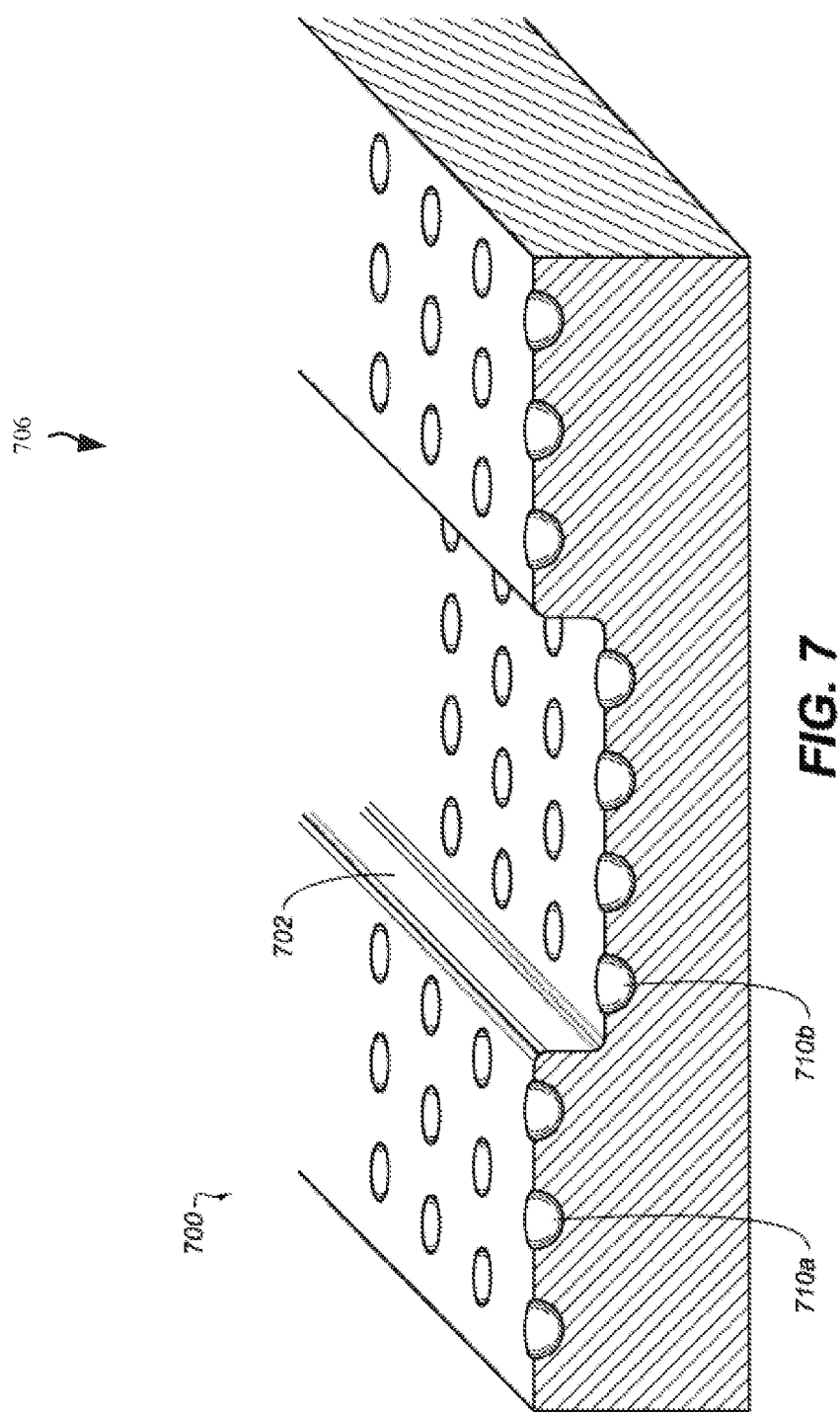
FIG. 7 depicts a cross-sectional view of an example textured pattern on a surface of a part adapted for variations in surface height.
Figure 8:
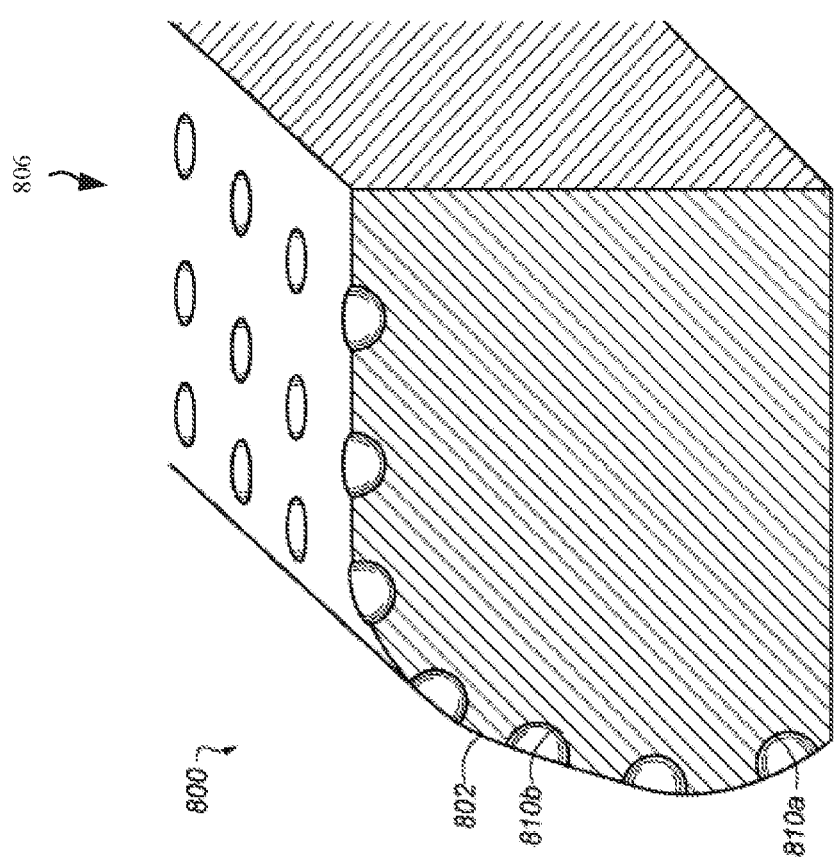
FIG. 8 depicts a cross-sectional view of an example textured pattern on a surface of a part adapted for variations in contour profile.

The examples of FIGS. 6-8 depict example textured patterns or other laser-created feature that can be produced in accordance with the processes discussed above. In particular, the scanner and laser process of 560 may be particularly advantageous in forming the following laser-based features.

FIG. 6 depicts an example textured pattern formed on a surface of a part. In this example, the textured pattern is located (e.g., registered) with respect to an existing feature on the surface of the part. In particular, FIG. 6 depicts an example part 600 having an existing recessed feature 602 formed in a surface of the part 600. A textured pattern 610 may be formed in the bottom of the recessed feature 602 in accordance with process 560, discussed above with respect to FIG. 5C. In particular, a scanning mechanism may scan a region of the surface of the part 600 that overlaps with the recessed feature 602. The scan may detect aspects of the surface geometry of the surface, including, for example, one or more edges of the recessed feature 602. A reference point on the surface may be determined or calculated based on the scanned surface geometry. For example, the corners of the recessed feature 602 or the perimeter edge of the recessed feature 602 may be used to determine one or more reference points. One or more laser texturing parameters, including for example, a laser texturing sequence, may then be created or adapted based on the one or more reference points. For example, a laser texturing sequence which includes instructions to form a textured pattern over an area bounded by the recessed feature 602 may be created based on one or more reference points that correspond to the actual measured boundaries of the recessed feature 602. Thus, a customized textured pattern may be created that substantially conforms with existing geometry or features on the surface of the part.

In some embodiments, a similar technique is used to locate other laser-created features with respect to existing geometry or features formed on the surface of the part. For example, a laser machining operation may be performed to enhance the edge quality of a previously machined feature. With reference again to FIG. 6, the recessed feature 602 may be formed into the surface of the part 600 using a milling machining operation performed using a rounded end-mill cutting tool. In some cases, the recessed feature 602 may be initially formed with rounded internal corners due to the shape of the rounded cutting tool. In this scenario, a laser-based process can be used to remove the rounded corners left by the machining operation. In one example, the machined recessed feature 602 is scanned to obtain the surface geometry. One or more reference points may be generated based on the scan and a custom laser sequence may be created. In one example, the laser sequence is used to register a laser-based cutting operation with respect to the recessed feature 602 and remove the rounded material in the corners of the recessed feature 602. Thus, a scanner can be used to locate or register other types of laser-based operations with respect to existing geometry or features in the surface of a part.

FIG. 7 depicts a cross-sectional view of an example textured pattern on a surface of a part. In particular, FIG. 7 depicts a textured pattern 710 on the surface of a part 700 having a textured pattern that has been customized to account for variations in surface height on the part 700. As shown in FIG. 7, the surface of the part 700 varies in height as indicated by depression 702. While not to scale, the depression 702 may be an artifact of another manufacturing process or may be a naturally occurring feature on the surface of the part 700.

As shown in FIG. 7, a textured pattern 706 is formed in the surface of the part 700 by using a laser to ablate a distribution of small texture features (e.g., pocket features 710a, 710b) in the surface of the part 700. In some cases, the texture features are formed as small round pockets having a diameter of less than 1 mm. In some cases the texture features are formed as features having a size of less than 100 um. The size and shape of the texture features may vary in different applications. The depth and shape of the blind pockets (710a, 710b) may determine the visual appearance of the textured pattern 706. If the textured pattern 706 is created without compensation for the depression 702, the portion of the textured pattern within the depression 702 vary in height and/or size. In some cases, this may result in a variation in the visual appearance of the textured pattern in that area, which may be undesirable.

However, by scanning the surface of the part 700 using, for example, an optical scanner mechanism, the location and magnitude of any height variations may be detected and used to form a customized textured pattern that accommodates the variations in the height of the surface. In one non-limiting example, the surface of the part 700 is scanned and the digitized surface is used to detect a variation in the height of the surface. In some cases, a laser texturing parameter associated with an ablation depth is determined based on the variation in the height of the surface. When forming the textured pattern, at least a portion of the textured pattern may then be formed at the ablation depth, thereby compensating for variations in the height of the surface of the part 700. In particular, texture feature 710b formed within the depression 702 is formed at substantially the same depth and shape as other texture features 710b. While this example is directed to a part having a depression 702, a similar technique may also be applied to other types of surface variations or surface anomalies.

FIG. 8 depicts a cross-sectional view of an example textured pattern on a surface of a part. In particular, FIG. 8 depicts a textured pattern 810 on the surface of a part 800 having a textured pattern that has been customized to account for variations in contour shape. As shown in FIG. 8, the contour shape of the surface varies as indicated by flattened region 802. As discussed previously and shown in FIG. 8, a textured pattern 806 may be formed in the surface of the part 800 by using a laser to ablate a series of texture features (e.g., pocket features 810a, 810b) in the surface of the part 800. As discussed above, variations in the size and shape of texture features may result in an undesirable variation in the visual appearance of the textured pattern.

However, by scanning the surface of the part 800 using, for example, an optical scanner mechanism, the variations in the contour profile may be detected and used to form a customized textured pattern that accommodates the variations. In one non-limiting example, the surface of the part 800 is scanned and the digitized surface is used to detect a variation in the contour shape of the surface. In some cases, a laser texturing parameter associated with a laser texturing profile is determined based on the variation in contour shape the surface. When forming the textured pattern, at least a portion of the textured pattern may then be formed at in accordance with the laser texturing profile, thereby compensating for variations in the contour shape of the surface of the part 800.

In some cases a similar technique can be used to process a variety of differently shaped parts using the same laser texturing equipment and programming instructions. For example, the example system 400 of FIG. 4 discussed above may be programmed with a set of instructions that causes the scanner to digitize the surface of a part. The instructions may further configure the system to create a customized texture pattern in accordance with the digitized surface.

We claim:

1. A method of producing patterns on contoured regions of a surface of a housing, wherein the housing is suitable for carrying components of a consumer electronic product, the method comprising:
    forming a first textured pattern, in a form of first recesses, along a first contoured region of the surface having a first surface curvature by causing a laser beam to impinge the first contoured region at a pre-determined angle of incidence with respect to a normal of the first contoured region, wherein the first textured pattern has an amount of light reflectivity when visible light is incident upon the first textured pattern; and
    forming a second textured pattern, in a form of transition zone recesses, in a transition contoured region having a second surface curvature different than the first surface curvature, by moving the housing such that the laser beam impinges the transition contoured region at the pre-determined angle of incidence with respect to a normal of the transition contoured region, wherein the second textured pattern has the amount of light reflectivity when the visible light is incident upon the second textured pattern.

2. The method of claim 1, wherein the forming of the first textured pattern is based on a first set of laser parameters that are based on the first surface curvature, and the forming of the second textured pattern is based on a second set of laser parameters that are based on the second surface curvature.

3. The method of claim 1, wherein the laser beam is emitted by a laser mechanism, and prior to forming the second textured pattern, a distance between the laser mechanism and the surface of the housing is adjusted.

4. A method of producing patterns on first and second contoured surfaces of a housing for a portable electronic device capable of carrying components, the method comprising:
    forming a first textured pattern on the first contoured surface having a first surface height by using a laser beam to modify specular properties of the first contoured surface, wherein the laser beam is oriented at a pre-determined angle of incidence with respect to a normal of the first contoured surface, and the first textured pattern has an amount of specular properties when visible light is incident upon the first textured pattern; and
    forming a textured transition pattern on a transition zone of the second contoured surface with the laser beam such as to modify specular properties of the transition zone, wherein the laser beam is oriented at the pre-determined angle of incidence with respect to a normal of the transition zone, the transition zone having a second surface height different than the first surface height, and wherein the textured transition pattern has the amount of specular properties when the visible light is incident upon the textured transition pattern.

5. A method of forming a continuous textured pattern on a surface of a housing for a portable electronic device having a non-planar geometry, wherein the housing is capable of carrying components, the method comprising:
    forming a first textured pattern of recesses on a first region of the surface characterized as having a first surface curvature, wherein the first region is characterized as having a pre-determined amount of light reflectivity when visible light is incident at the first textured pattern of recesses, by directing a laser beam from a laser mechanism at a pre-determined angle of incidence relative to a normal of the first region; and
    forming a second textured pattern of recesses on a second region of the surface characterized as having a second surface curvature that is different than the first surface curvature, wherein the second region is characterized as having the pre-determined amount of light reflectivity when the visible light is incident at the second textured pattern of recesses that is adjacent to the first textured pattern of recesses, by moving the housing relative to the laser mechanism such as to adjust a distance between the surface of the housing and the laser mechanism while maintaining the laser beam at the pre-determined angle of incidence relative to a normal of the second region.

6. The method of claim 5, wherein the first textured pattern of recesses is visually indistinguishable from the second textured pattern of recesses while moving the housing relative to the laser mechanism.

7. The method of claim 5, wherein the first surface curvature has a first shape and the second surface curvature has a second shape different than the first shape.

8. The method of claim 5, further comprising:
    forming a third textured pattern of recesses on a third region of the surface, the third textured pattern of recesses being adjacent to the second textured pattern of recesses.

9. The method of claim 5, wherein the laser beam modifies specular properties of the first and second regions of the surface.

10. The method of claim 5, wherein the laser mechanism is re-positioned prior to forming the second textured pattern of recesses on the second region of the surface.

11. The method of claim 4, wherein the first contoured surface has a first surface curvature and the second contoured surface has a second surface curvature different than the first surface curvature.

12. The method of claim 1, further comprising:
    identifying variations in heights of the first and second contoured regions;
    generating one or more laser texturing parameters based on the variations in the heights; and
    forming the first and second textured patterns based on the one or more laser texturing parameters.

13. The method of claim 12, wherein, prior to forming the first textured pattern, the method further comprises:
    identifying variations in textures of the first and second contoured regions; and
    generating one or laser texturing parameters based on the variations in the textures.

14. The method of claim 4, wherein the forming of the first textured pattern is based on a first set of laser parameters that are based on the first surface height, and the forming of the second textured pattern is based on a second set of laser parameters that are based on the second surface height.

15. The method of claim 14, wherein, prior to forming the first textured pattern and the textured transition pattern, the method further comprises:
    identifying variations in textures of the first and second contoured surfaces; and
    generating one or laser texturing parameters based on the variations in the textures.

16. The method of claim 5, wherein, prior to forming the first textured pattern of recesses and the second textured pattern of recesses, the method further comprises:
    identifying variations in heights of the first and second regions; and
    generating one or more laser texturing parameters based on the variations in the heights.

17. The method of claim 1, wherein the first contoured region has a different surface height than the second contoured region.

\* \* \* \* \*